United States Patent
Mashitani et al.

(10) Patent No.: US 7,317,494 B2
(45) Date of Patent: Jan. 8, 2008

(54) AUTOSTEREOSCOPIC VIDEO DISPLAY WITH A PARALLAX BARRIER HAVING OBLIQUE APERTURES

(75) Inventors: Ken Mashitani, Osaka (JP); Goro Hamagishi, Osaka (JP)

(73) Assignee: Sanyo Electric Co., Ltd., Osaka (JP)

( * ) Notice: Subject to any disclaimer, the term of this patent is extended or adjusted under 35 U.S.C. 154(b) by 441 days.

(21) Appl. No.: 10/936,513

(22) Filed: Sep. 9, 2004

(65) Prior Publication Data

US 2005/0052529 A1 Mar. 10, 2005

(30) Foreign Application Priority Data

Sep. 9, 2003 (JP) .............................. 2003-316812

(51) Int. Cl.
*H04N 13/04* (2006.01)
(52) U.S. Cl. .................... 348/739; 348/54; 359/462
(58) Field of Classification Search ................ 348/739, 348/558, 51, 54, 59, 832, 835; 345/6; 363/7; 359/462, 463; 353/7
See application file for complete search history.

(56) References Cited

U.S. PATENT DOCUMENTS

| 5,956,001 | A | * | 9/1999 | Sumida et al. ................ 345/55 |
| 6,040,807 | A | * | 3/2000 | Hamagishi et al. ............ 345/6 |
| 6,064,424 | A |   | 5/2000 | Van Berkel et al. |
| 6,160,527 | A | * | 12/2000 | Morishima et al. ............ 345/7 |
| 6,246,451 | B1 | * | 6/2001 | Matsumura et al. .......... 349/15 |
| 6,445,406 | B1 | * | 9/2002 | Taniguchi et al. ............ 348/51 |
| 6,459,532 | B1 | * | 10/2002 | Montgomery et al. ....... 359/462 |
| 6,462,871 | B1 | * | 10/2002 | Morishima ................... 359/463 |
| 6,603,504 | B1 | * | 8/2003 | Son et al. ..................... 348/54 |
| 6,825,985 | B2 | * | 11/2004 | Brown et al. ................ 359/619 |
| 6,974,216 | B2 | * | 12/2005 | Pezzaniti ....................... 353/7 |
| 7,070,278 | B2 | * | 7/2006 | Pezzaniti ....................... 353/7 |
| 7,106,274 | B2 | * | 9/2006 | Nishihara et al. .............. 345/6 |
| 7,116,477 | B2 | * | 10/2006 | Nishihara et al. ........... 359/462 |
| 2002/0054430 | A1 | * | 5/2002 | Takikawa et al. ........... 359/462 |
| 2003/0206343 | A1 | * | 11/2003 | Morishima et al. .......... 359/463 |

FOREIGN PATENT DOCUMENTS

| JP | 08-331605 | 12/1996 |
| JP | 11-084131 | 3/1999 |
| JP | 3096613 | 8/2000 |
| JP | 3096613 B | 8/2000 |
| JP | 2004-191570 | 7/2004 |

* cited by examiner

*Primary Examiner*—Victor R. Kostak
(74) *Attorney, Agent, or Firm*—McDermott Will & Emery LLP

(57) ABSTRACT

In the case of a four-eye type stereoscopic viewing system, four videos (dots) "video ecrc;1, video ecrc;2, video ecrc;3, and video ecrc;4" composing each of minimum units of video group are repeatedly arranged in a horizontal direction of a screen, and the minimum units of video group are arranged so as to be shifted by one dot in the horizontal direction per row. Edges for defining the width of an aperture are obliquely formed in correspondence with the shift in the horizontal direction of the minimum units of video group, and the aperture is formed so as to extend across the respective minimum units of video group on the rows, the edges being straight.

15 Claims, 6 Drawing Sheets

*PRIOR ART*

AUTOSTEREOSCOPIC VIDEO DISPLAY WITH A PARALLAX BARRIER HAVING OBLIQUE APERTURES

BACKGROUND OF THE INVENTION

Field of the Invention

The present invention relates to a video display utilized which allows a viewer to recognize stereoscopic viewing or allows plural viewers (more than one viewer) to respectively view different videos.

Conventionally known methods of realizing stereoscopic video display without requiring special glasses have been a parallax barrier method, a lenticular lens method, and so on. The methods are for alternately displaying a right eye video and a left eye video having binocular parallax in a vertically striped shape, for example, on a screen, separating the displayed videos using a parallax barrier, a lenticular lens, and so on, and respectively introducing the separated videos into the right eye and the left eye of a viewer to recognize stereoscopic viewing.

FIG. 3 is an explanatory view showing the principle of a four-eye type stereoscopic viewing system. A video(image) ①, a video(image) ②, a video(image) ③, and a video (image) ④ having binocular parallax in a horizontal direction of a screen 11 are arranged with a predetermined pitch, and minimum units of video (image) group each comprising four videos "video ①, video ②, video ③, and video ④" are repeatedly arranged. An aperture 12a of a parallax barrier 12 is formed in correspondence with each of the minimum units of video group, to separate the four videos "video ①, video ②, video ③, and video ④" composing the minimum unit of video group and give the separated videos to a viewer. Consequently, stereoscopic viewing can be recognized by the viewer.

FIG. 4 is an explanatory view showing the principle of a video display which allows different viewers to respectively view four different videos. The video display also comprises a screen 11 and a parallax barrier 12, similar to the stereoscopic viewing system shown in FIG. 3. Each of apertures 12a of the parallax barrier 12 separates four videos "video ①, video ②, video ③, and video ④" composing each of minimum units of video group and respectively gives the separated videos to the viewers. Consequently, the viewers respectively view the different videos.

When the same video (image) is displayed utilizing dots in a vertical direction, the apertures 12a of the parallax barrier 12 are generally formed in a vertically striped shape, as shown in FIG. 5. When the same video is displayed utilizing dots in an oblique direction, there is also a method of arranging apertures of a parallax barrier in an oblique direction (see JP, 3096613, B).

SUMMARY OF THE INVENTION

When light from a dot is given to the eyes of a viewer through an aperture 12a, there exist a state where light from the whole dot is given, as shown in FIG. 6A, and a state where a non-dot part is seen, as shown in FIG. 6B. The coexistence of the former bright part and the latter dark part makes the viewer to feel moiré.

In order to reduce the moiré, the aperture 12a may be made large, as illustrated in FIGS. 7A, 7B, and 7C. The large aperture 12a allows approximately the same amount of light to be introduced into the eyes of the viewer even if the positional relationship between the dot and the aperture 12a is changed. Therefore, the difference between the bright part and the dark part is reduced, thereby reducing the moiré. When the large aperture 12a is adopted, however, crosstalk may occur. Particularly on a screen (a display) where dots are arranged with a pitch of approximately 0.04 mm, the width of the aperture 12a must be set to approximately 0.08 mm in order to reduce the moiré. In a relative large aperture to the dot, therefore, the crosstalk is significantly increased. In the apertures 12a shown in FIGS. 7A, 7B, and 7C, the way of diffraction varies from FIG. 7A to FIG. 7C. Therefore, the moiré cannot be sufficiently reduced.

In view of the foregoing circumstances, an object of the present invention is to provide a video display capable of reducing the occurrence of crosstalk and moiré by devising an aperture serving as separating means.

In order to solve the above-mentioned problem, in a video display that separates videos, which are different from one another, displayed on a screen by an aperture serving as separating means, a video display according to the present invention is characterized in that minimum units of video group each serving to display the different videos are arranged so as to be shifted by one dot in a horizontal direction per row, edges for defining the width of the aperture are obliquely formed in correspondence with the shift, and the aperture is formed so as to extend across the respective minimum units of video group on the rows, the edges being straight.

In the above-mentioned configuration, moiré can be reduced while preventing crosstalk. Because the change in brightness caused by the change in relative position between the aperture and the dot becomes gradual and the bad influence of the diffraction of light is reduced by equalizing the effect of the diffraction of light.

Letting θ be the slope of the edges, Pv be the vertical dot pitch, and Ph be the horizontal dot pitch, Tan θ=Ph/Pv may be satisfied.

In the video display having these configurations, each of the minimum units of video group may be composed of plural viewpoint videos, and the plural viewpoint videos may be arranged in the order in which viewpoints are arranged. Furthermore, the width of the aperture may coincide with the horizontal dot pitch.

The foregoing and other objects, features, aspects and advantages of the present invention will become more apparent from the following detailed description of the present invention hen taken in conjunction with the accompanying drawings.

DESCRIPTION OF THE PREFERRED EMBODIMENTS

Figure 3:
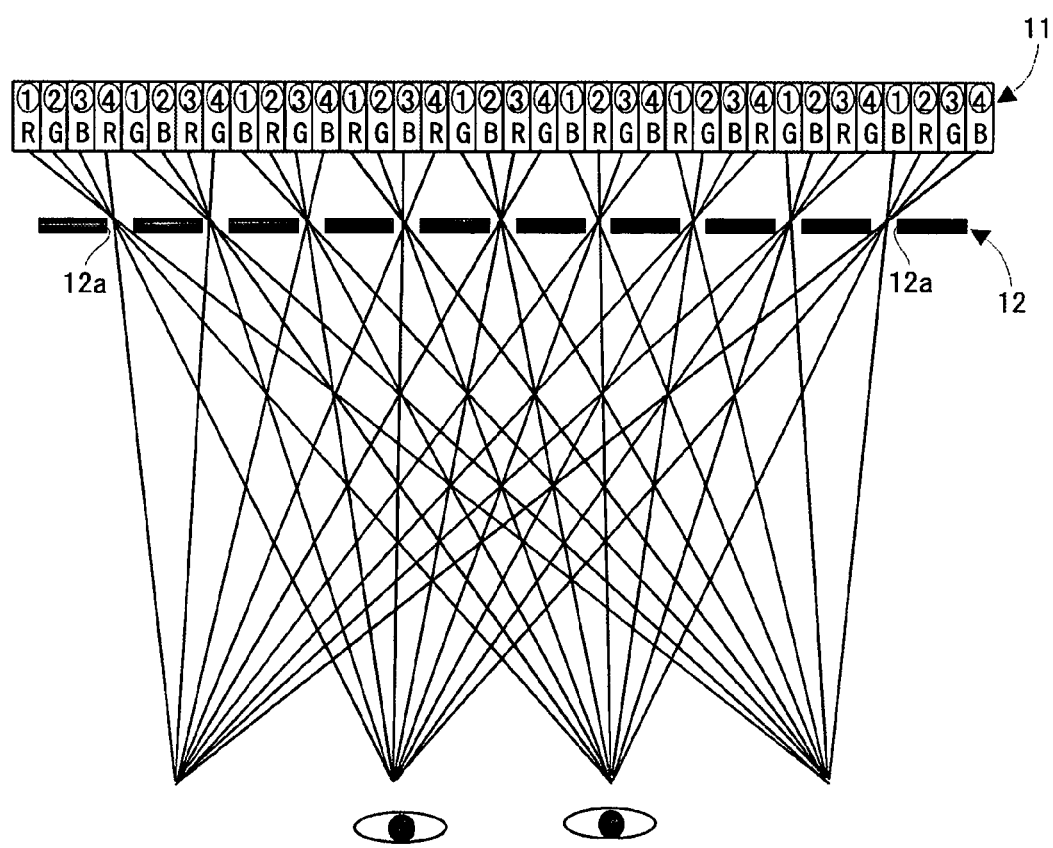
FIG. 3 is an explanatory view showing a four-eye type stereoscopic viewing system.
Figure 4:
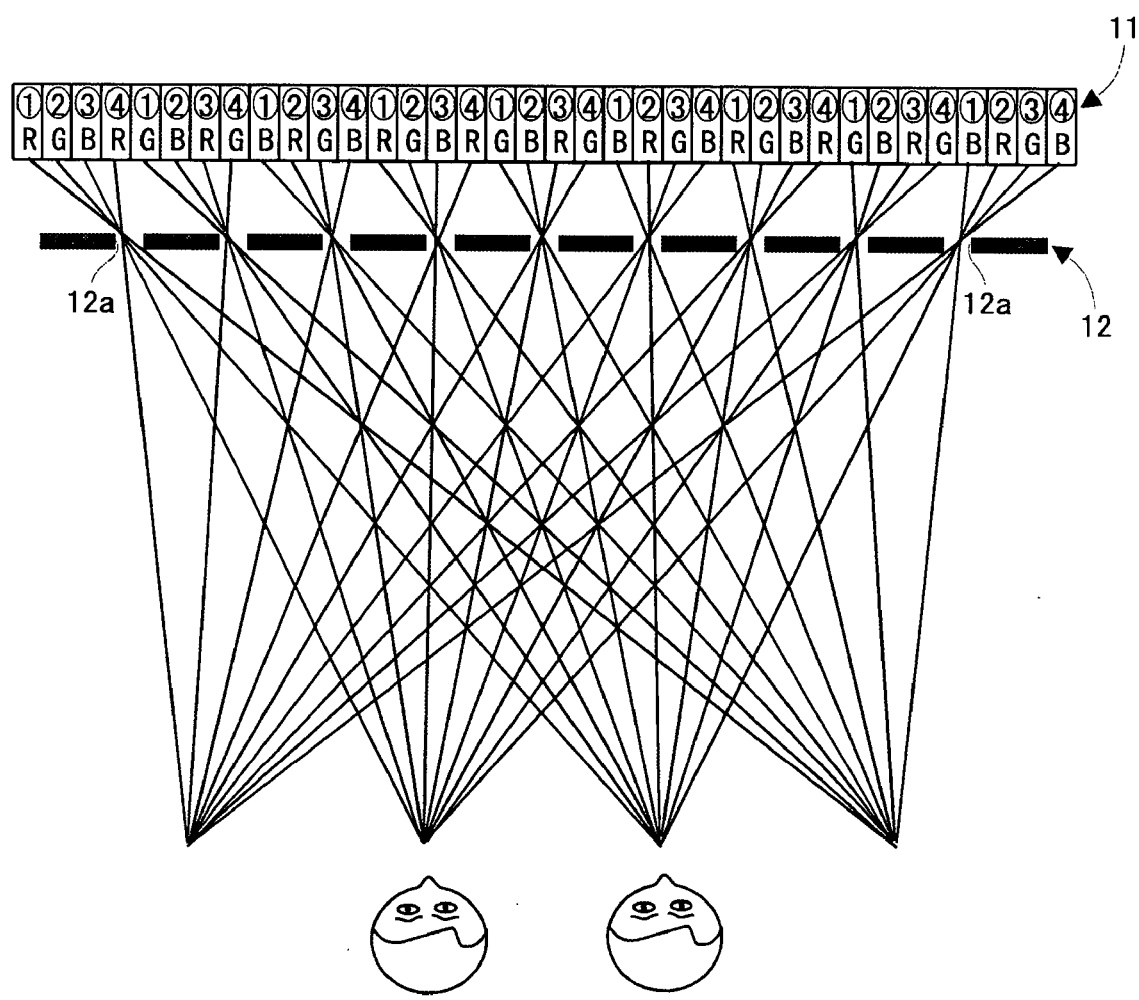
FIG. 4 is an explanatory view showing a video display capable of respectively introducing four different videos into viewers.
Figure 5:
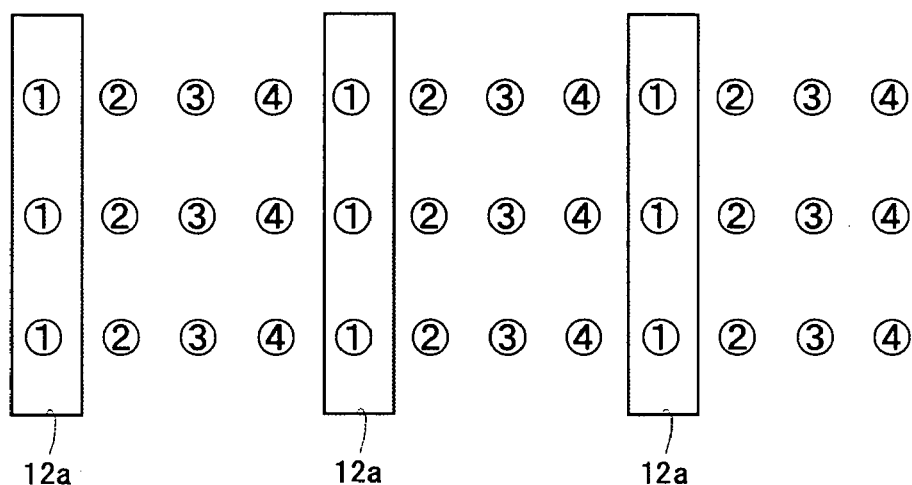
FIG. 5 is an explanatory view showing the conventional relationship between an array of dots and an aperture on a screen.
Figure 6A:
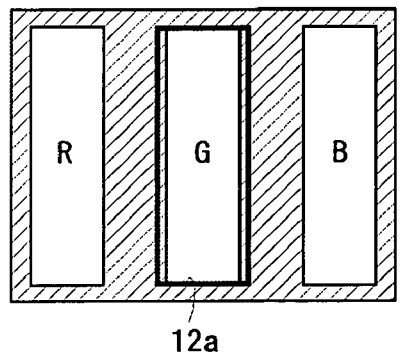
FIGS. 6A and 6B are explanatory views each showing the conventional relationship between an array of dots and an aperture on a screen.
Figure 6B:
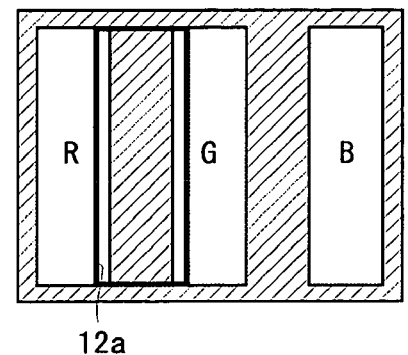
Figure 7A:
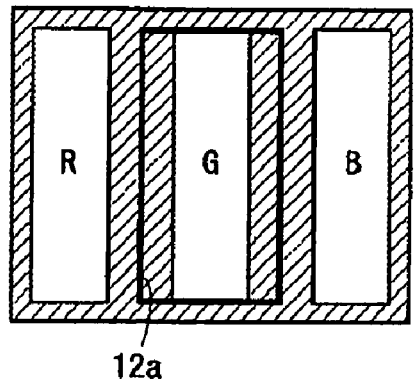
FIGS. 7A, 7B, and 7C are explanatory views each showing the conventional relationship between an array of dots and an aperture on a screen.
Figure 7B:
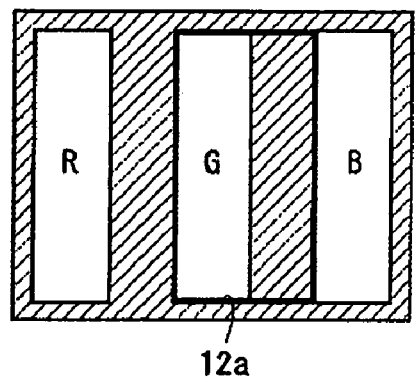
Figure 7C:
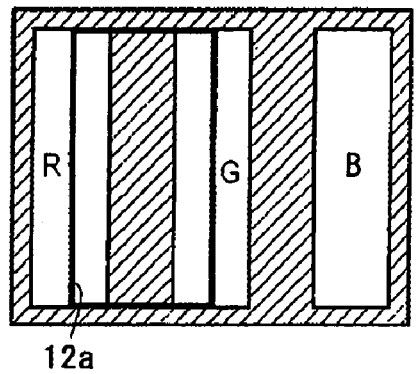

A video display according to an embodiment of the present invention will be described on the basis of FIGS. 1, 2A, and 2B. The overall configuration of the video display can adopt the configurations shown in FIGS. 3 and 4 described in the background art, and the description thereof is not repeated in order to avoid redundancy by repetition of descriptions.

Figure 1:
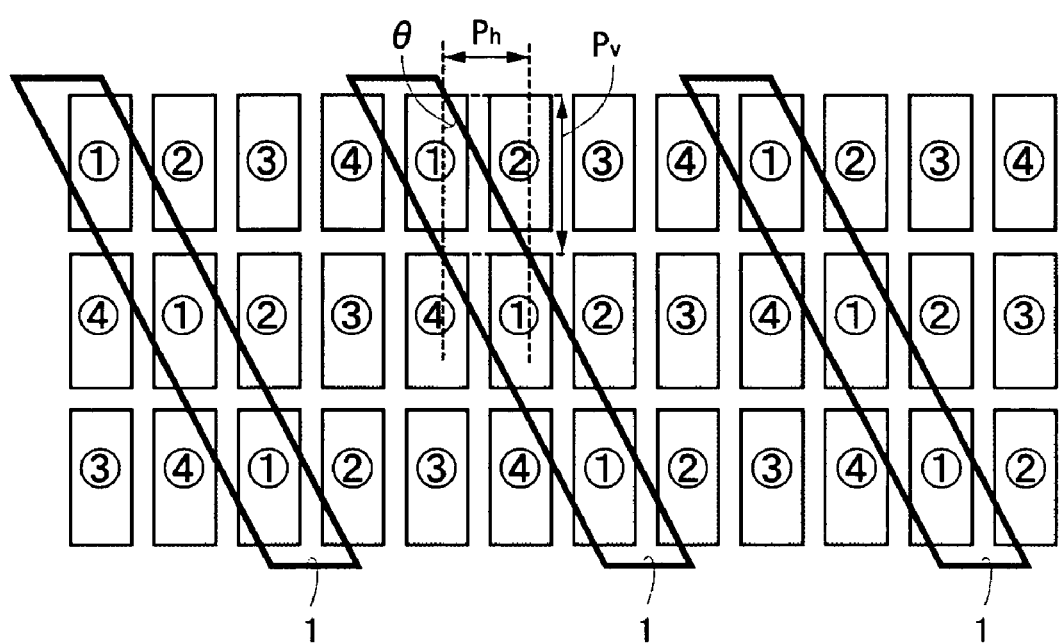
FIG. 1 is an explanatory view of an embodiment of the present invention, illustrating an array of videos and an aperture serving as separating means in a video display.

In a four-eye type configuration shown in FIG. 1, four videos (dots) "video ①, video ②, video ③, and video ④" composing each of minimum units of video group are repeatedly arranged in a horizontal direction of a screen, and the minimum units of video group are arranged so as to be shifted by one dot in the horizontal direction per row. When the video display is a video display for stereoscopic viewing, each of the minimum units of video group is composed of plural viewpoint (multi-viewpoint) videos, and the plural viewpoint videos are arranged in the order in which viewpoints are arranged (the order is 1, 2, 3, and 4), as described above. Edges for defining the width of an elongate aperture (video separating means) 1 are obliquely formed in correspondence with the shift in the horizontal direction of the minimum units of video group, and the elongate aperture 1 is formed so as to extend across (overlie) the respective minimum units of video group on the rows. The edges are straight. That is, one elongated oblique aperture 1 is formed in correspondence with plural minimum units of video group which are arranged so as to be shifted by one dot in the horizontal direction per row. Letting θ be the slope of the edges from a vertical line, Pv be the vertical dot pitch, and Ph be the horizontal dot pitch, Tan θ=Ph/Pv is satisfied. Further, the width of the aperture 1 coincides with the horizontal dot pitch (Ph).

Figure 2A:
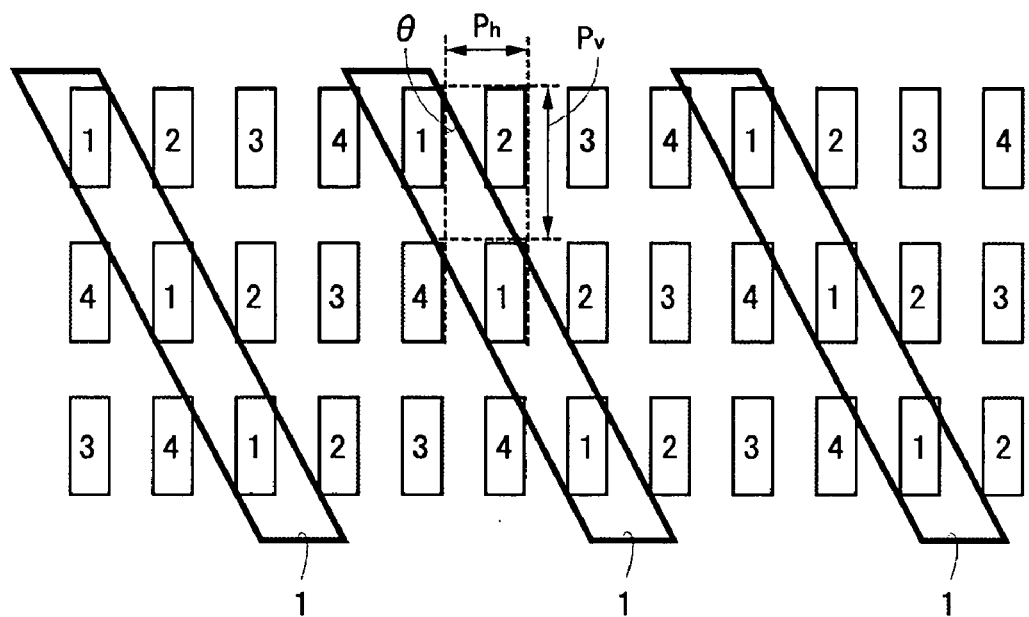
FIG. 2A is an explanatory view of another embodiment of the present invention, illustrating an array of videos and an aperture serving as separating means in a video display.
Figure 2B:
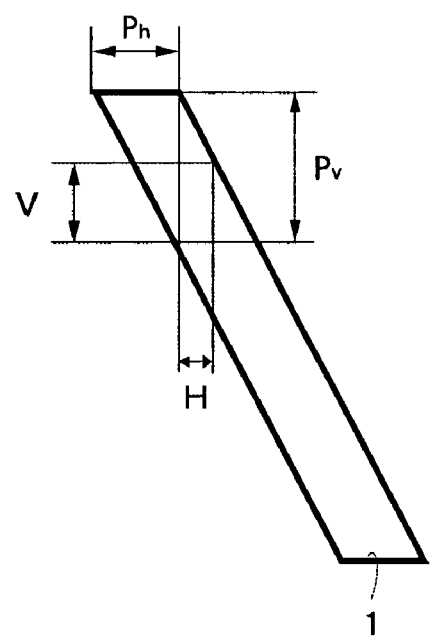
FIG. 2B is an explanatory view showing an aperture and the size of a dot.

Similarly in a four-eye type configuration shown in FIG. 2A, four videos (dots) "video ①, video ②, video ③, and video ④" composing each of minimum units of video group are repeatedly arranged in a horizontal direction of a screen, and the minimum units of video group are arranged so as to be shifted by one dot in the horizontal direction per row. When the video display is a video display for stereoscopic viewing, each of the minimum units of video group is composed of plural viewpoint (multi-viewpoint) videos, and the plural viewpoint videos are arranged in the order in which viewpoints are arranged (the order is 1, 2, 3, and 4), as described above. Edges for defining the width of an elongate aperture (video separating means) 1 are obliquely formed in correspondence with the shift in the horizontal direction of the minimum units of video group, and the elongate aperture 1 is formed so as to extend across (overlie) the respective minimum units of video group on the rows. The edges are straight. Letting θ be the slope of the edges, Pv be the vertical dot pitch, and Ph be the horizontal dot pitch, Tan θ=Ph/Pv is satisfied. Further, the width of the aperture 1 coincides with the horizontal dot pitch (Ph).

In the configuration shown in FIG. 1, the width of the dot is set to the size that part of undesirable dots (e.g. dot ② in FIG. 1) are viewed through the aperture 1 at any position. On the other hand, in the configuration shown in FIG. 2A, the width of the dot is set to the size that undesirable dots are not viewed at suitable position. Further, crosstalk is reduced. Here, letting V be the aperture height of the dot, and H be such an aperture width that the undesirable dots are not viewed at suitable position, as shown in FIG. 2B, H=Ph× (Pv−V)/Pv is satisfied.

According to the present invention, moiré can be reduced while preventing crosstalk. Because the change in brightness caused by the change in relative position between the aperture and the dot becomes gradual and the bad influence of the diffraction of light is reduced by equalizing the effect of the diffraction of light.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A video display that display separates videos, which are different from one another, on a screen comprising:
   image units each serving to display the different videos that are arranged so as to be shifted by one dot in a horizontal direction per row; and
   a plurality of apertures to separate the videos, wherein straight edges for defining the width of the apertures are obliquely formed in correspondence with the shift, and each of the apertures is formed so as to extend across the respective image unit on the rows.

2. The video display according to claim 1, wherein letting θ be the slope of the edges, Pv be the vertical dot pitch, and Ph be the horizontal dot pitch, Tan θ=Ph/Pv is satisfied.

3. The video display according to claim 1, wherein each of the image units is composed of plural viewpoint videos, and the plural viewpoint videos are arranged in the order in which viewpoints are arranged.

4. The video display according to claim 2, wherein each of the image units is composed of plural viewpoint videos, and the plural viewpoint videos are arranged in the order in which viewpoints are arranged.

5. The video display according to claim 1, wherein the width of the aperture coincides with the horizontal dot pitch.

6. The video display according to claim 2, wherein the width of the aperture coincides with the horizontal dot pitch.

7. The video display according to claim 3, wherein the width of the aperture coincides with the horizontal dot pitch.

8. The video display according to claim 4, wherein the width of the aperture coincides with the horizontal dot pitch.

9. A video display configured to display a plurality of separate videos, which are different from one another, comprising:
   a plurality of image units arranged to display said videos as a plurality of groups of dots on a screen arranged in a plurality of horizontal rows, so that a part of an image from each one of said videos is displayed as at least one dot in each one of said groups, the plurality of groups being arranged so that, in each of the second row to the last of said horizontal rows, parts of the images from the same one of said videos are displayed as dots that are offset from the dots corresponding to said one of said videos in the immediately preceding row by a horizontal distance corresponding to the horizontal pitch of said dots; and
   a plurality of apertures (1) having edges defining their width, extending across a predetermined number of the dots of a respective group in each row so as to separate said videos, thereby forming a parallax barrier, wherein each of the apertures (1) has elongated straight edges that extend across said plurality of horizontal rows and that are oblique to correspond with the offsets between the dots displaying parts of the image from said one video in different rows, and the width of said aperture (1) coincides with said horizontal pitch of said dots.

10. The video display according to claim 1, wherein where θ denotes the slope of the edges, Pv denotes a vertical pitch of the dots on the screen, and Ph denotes the horizontal pitch of the dots on the screen, $$\tan\theta = \frac{Ph}{Pv}$$

is satisfied.

11. The video display according to claim 1, wherein: where Pv denotes a vertical pitch of the dots on the screen, Ph denotes the horizontal pitch of the dots on the screen, V denotes an aperture height of the dots on the screen and H denotes an aperture width of the dots on the screen, $$H = Ph\frac{(Pv - V)}{Pv}$$

is satisfied.

12. The video display according to claim 1, wherein said videos are plural viewpoint videos; and the image units are arranged to display parts of images from respective ones of said plural viewpoint videos on the screen according to the order in which viewpoints are arranged.

13. A method of displaying a plurality of different videos simultaneously on a video display apparatus, comprising steps of:

displaying images from said different videos, using a plurality of image units, said images being displayed as a plurality of groups of dots on a screen arranged in a plurality of horizontal rows, so that a part of an image from each one of said videos is displayed as at least one dot in each one of said groups, the plurality of groups being arranged so that, in each of the second row to the last of said horizontal rows, parts of the images from the same one of said videos are displayed as dots that are offset from the dots corresponding to said one of said videos in the immediately preceding row by a horizontal distance corresponding to the horizontal pitch of said dots; and separating said videos using a plurality of apertures (1) extending across a predetermined number of the dots of a respective group in each row;

wherein the apertures (1) have elongated straight edges that extend across said plurality of horizontal rows and that are oblique to correspond with the offsets between the dots displaying parts of the image from said one video in different rows and the width of said apertures (1) coincides with said horizontal pitch of said dots.

14. A method according to claim 13, wherein said plurality of videos is a plural viewpoint video and the number of viewpoints of the plural viewpoint video.

15. A method according to claim 14, further comprising a step of:

arranging the dots to display parts of images from respective ones of said plural viewpoint videos on the screen according to the order in which viewpoint.

* * * * *